(12) United States Patent
Al-Attar et al.

(10) Patent No.: US 7,890,200 B2
(45) Date of Patent: Feb. 15, 2011

(54) PROCESS-RELATED SYSTEMS AND METHODS

(75) Inventors: Akeel Al-Attar, Manchester (GB); Clive Duebel, Horsham (GB)

(73) Assignee: BP Exploration Oerating Company Limited (GB)

( * ) Notice: Subject to any disclaimer, the term of this patent is extended or adjusted under 35 U.S.C. 154(b) by 86 days.

(21) Appl. No.: 11/571,744

(22) PCT Filed: Jul. 6, 2005

(86) PCT No.: PCT/GB2005/002643
§ 371 (c)(1), (2), (4) Date: Jan. 6, 2007

(87) PCT Pub. No.: WO2006/003449
PCT Pub. Date: Jan. 12, 2006

(65) Prior Publication Data
US 2007/0185586 A1 Aug. 9, 2007

(30) Foreign Application Priority Data
Jul. 6, 2004 (GB) .................. 0415144.5

(51) Int. Cl.
| | |
|---|---|
| G06F 19/00 | (2006.01) |
| G05B 11/01 | (2006.01) |
| G05B 15/00 | (2006.01) |
| F16K 31/36 | (2006.01) |
| E21B 47/00 | (2006.01) |
| F04B 51/00 | (2006.01) |
| G01V 3/00 | (2006.01) |
| G01V 1/40 | (2006.01) |
| G04F 1/00 | (2006.01) |
| G21C 17/00 | (2006.01) |
| G06F 11/30 | (2006.01) |

(52) U.S. Cl. .............. 700/95; 700/17; 700/83; 137/487.5; 73/152.01; 73/152.62; 324/323; 324/375; 702/6; 702/13; 702/179; 702/182; 702/187; 703/10; 166/250.01; 175/40

(58) Field of Classification Search ........... 700/17, 700/83, 95; 702/179, 182, 187, 6–13; 703/12, 703/10; 73/152.01–152.62; 324/323–375; 340/853.1–856.4; 166/250.01; 175/40; 137/487.5
See application file for complete search history.

(56) References Cited

U.S. PATENT DOCUMENTS 3,969,703 A * 7/1976 Kwiatkowski et al. ........ 700/13

(Continued)

FOREIGN PATENT DOCUMENTS

EP 0334698 9/1989

(Continued)

*Primary Examiner*—Albert Decady
*Assistant Examiner*—Thomas H Stevens

(57) ABSTRACT

A process control system and method for use in controlling operation of a process in response to identification of one or more events, where each event is a condition relating to one or more process variables for the process and has a determined association with one or more other events, the system comprising: an event control module which is operative to log from the process the one or more process variables which are attributed to the one or more events, and provide a control indication in response to each identified event, wherein the control indication identifies the event as one of a cause event or an effect event and the one or more associated other events as effect events for a cause event or cause events for an effect event.

27 Claims, 3 Drawing Sheets

U.S. PATENT DOCUMENTS

Figure 1:
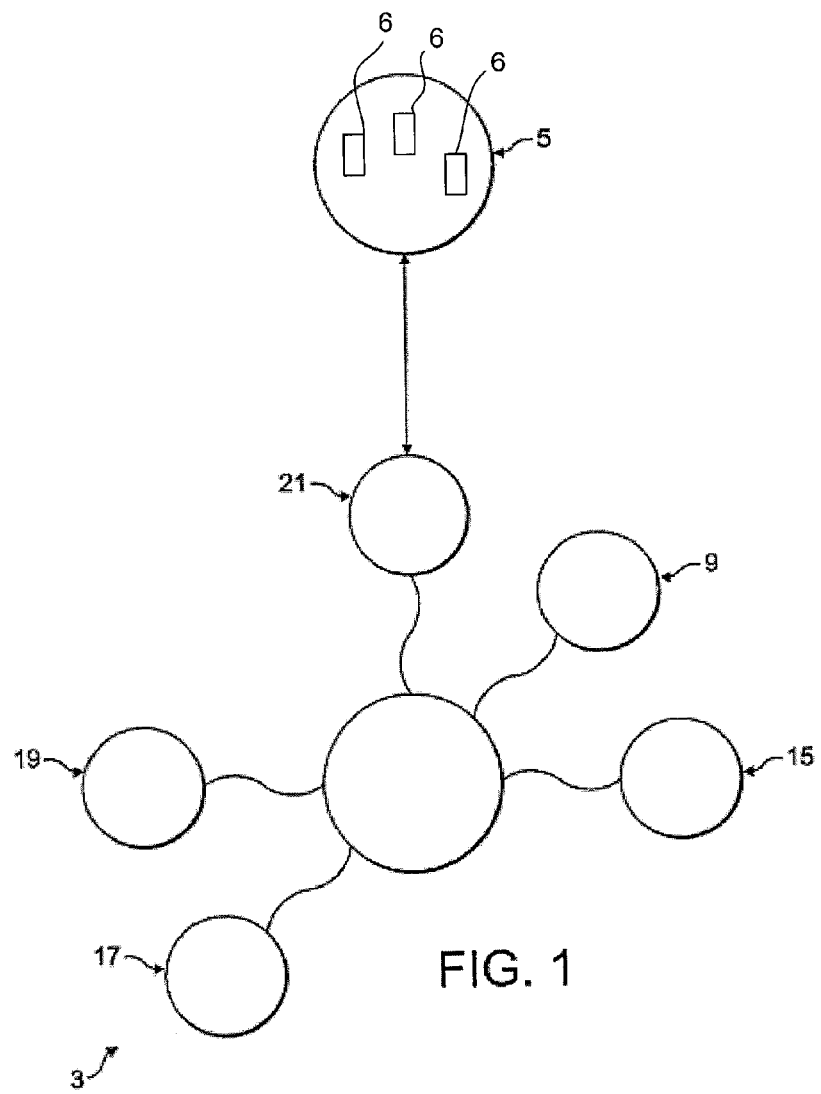

| | | | | |
|---|---|---|---|---|
| 4,803,039 | A * | 2/1989 | Impink et al. | 376/216 |
| 4,805,089 | A * | 2/1989 | Lane et al. | 700/83 |
| 5,257,206 | A * | 10/1993 | Hanson | 700/273 |
| 5,745,385 | A * | 4/1998 | Hinsberg et al. | 703/12 |
| 5,850,339 | A | 12/1998 | Giles | |
| 5,980,078 | A * | 11/1999 | Krivoshein et al. | 700/1 |
| 6,718,234 | B1 | 4/2004 | Demoro et al. | |
| RE38,640 | E * | 10/2004 | Jundt | 700/79 |
| 6,947,797 | B2 * | 9/2005 | Dean et al. | 700/79 |
| 6,988,171 | B2 * | 1/2006 | Beardsley et al. | 711/144 |
| 7,054,837 | B2 * | 5/2006 | Hoffman et al. | 705/28 |
| 7,062,417 | B2 * | 6/2006 | Kruger et al. | 703/2 |
| 7,206,646 | B2 * | 4/2007 | Nixon et al. | 700/83 |
| 7,280,877 | B2 * | 10/2007 | Shioya et al. | 700/17 |
| 7,305,520 | B2 * | 12/2007 | Voigt et al. | 711/112 |
| 7,357,298 | B2 * | 4/2008 | Pokorny et al. | 235/375 |
| 7,363,162 | B2 * | 4/2008 | Thambynayagam et al. | 702/12 |
| 7,546,228 | B2 * | 6/2009 | Cullick et al. | 703/10 |
| 7,657,480 | B2 * | 2/2010 | Harper | 705/37 |
| 2001/0037178 | A1 * | 11/2001 | Bush | 702/14 |
| 2002/0072882 | A1 * | 6/2002 | Kruger et al. | 703/2 |
| 2003/0088562 | A1 * | 5/2003 | Dillon et al. | 707/5 |
| 2003/0150909 | A1 * | 8/2003 | Markham et al. | 235/376 |
| 2004/0249491 | A1 * | 12/2004 | Hott | 700/95 |
| 2005/0159968 | A1 * | 7/2005 | Cozzolino | 705/1 |

FOREIGN PATENT DOCUMENTS

WO    WO03/005134    1/2003

* cited by examiner

PROCESS-RELATED SYSTEMS AND METHODS

This application is a national phase of International Application No. PCT/GB2005/002643 filed Jul. 6, 2005 and published in the English language.

The present invention relates to a system and method for use in controlling processes, in particular a system and a method for providing for the on-line monitoring of industrial manufacturing processes, which typically are required to operate in a continuous or semi-continuous mode.

The present invention finds particular application in relation to processes of a multivariable nature, that is, processes which have a plurality of input and output variables, and are very difficult to monitor and maintain at a desired performance measure.

In such processes, the complexity of the interactive influences, which arise from changes in the input variables, make it very difficult for operators rationally to understand the significance of the process variables in relation to critical performance measures. In principle, a change in any input variable can affect all of the output variables and the number of resulting permutations can be very large. By way of example, with 5 inputs and 4 outputs, there can be a total of 5!×4! (2880) interactions, if all input setpoints are manipulated.

The present applicant's earlier WO-A-03/005134 discloses an existing process-related system and method for improving the performance of complex process operations, and specifically utilizes rule sets, where representable as decision trees, to achieve a performance improvement.

The present applicant has now recognized that it is possible to achieve improved control of processes, which have a plurality of process variables, through the utilization of rule association in identifying associated events in a process.

Rule association per se is an established technique, but, to date, there has been no recognition whatsoever that rule association can be utilized in the control of process operations.

With this recognition, the present invention aims to provide a system and method for use in controlling processes, in particular monitoring processes in order to determine potential causes of a change in operation or any potential effects of a change in operation, as characterized by changes in measured values of process variables.

In one aspect the present invention provides a process control system for use in controlling operation of a process in response to identification of one or more events, where each event is a condition relating to one or more process variables for the process and has a determined association with one or more other events, the system comprising: an event control module which is operative to log from the process the one or more process variables which are attributed to the one or more events, and provide a control indication in response to each identified event, wherein the control indication identifies the event as one of a cause event or an effect event and the one or more associated other events as effect events for a cause event or cause events for an effect event.

In one embodiment, for a cause event, the control indication includes an estimation of a time period to manifestation of the one or more effect events.

In one embodiment the event control module is operative automatically to control operation of the process.

Preferably, the system further comprises: an event association module which is operative, for each identified event, to determine whether the event is a cause event or an effect event and an association with one or more other events as effect events or cause events.

Preferably, the system further comprises: an event identification module for testing process variables from within a data set against predetermined criteria to identify one or more events.

Preferably, the system further comprises: a data collection module for collecting historic data, which represents the process variables, as obtained from the process.

More preferably, the system further comprises: a data processing module for providing a data set from the historic data.

Preferably, each event represents a continuous time period during which one or more process variables satisfy a predetermined criteria.

In another aspect the present invention provides a process development system for use in predicting operation of a process which has a plurality of process variables, the system comprising: an event identification module which is operative to test process variables from within a data set against predetermined criteria to identify one or more events, where each event is a condition relating to one or more process variables; an event association module which is operative, for each identified event, to determine whether the event is a cause event or an effect event and an association with one or more other events; and an event control module which is operative, in response to input of the one or more process variables, to provide a control indication which identifies one or more events, and, for each identified event, identifies the event as one of a cause event or an effect event and the one or more associated other events as effect events for a cause event or cause events for an effect event.

Preferably, the system further comprises: a data collection module for collecting historic data, which represents the process variables, as obtained from the process.

More preferably, the system further comprises: a data processing module for providing the data set from the historic data.

Preferably, each event represents a continuous time period during which one or more process variables satisfy a predetermined criteria.

In a further aspect the present invention provides a process control method for use in controlling operation of a process in response to identification of one or more events, where each event is a condition relating to one or more process variables for the process and has a determined association with one or more other events, the method comprising the steps of: logging from the process the one or more process variables which are attributed to the one or more events; identifying whether the logged process variables satisfy the one or more events; and providing a control indication in response to each identified event, where the control indication identifies the event as one of a cause event or an effect event and the one or more associated other events as effect events for a cause event or cause events for an effect event.

In one embodiment, for a cause event, the control indication includes an estimation of a time period to manifestation of the one or more effect events.

In one embodiment the control indication is provided automatically to the process such as to control the same.

Preferably, the method further comprises the step of: for each identified event, determining whether the event is a cause event or an effect event and an association with one or more other events.

Preferably, the method further comprises the step of: testing process variables from within a data set against predetermined criteria to identify one or more events.

Preferably, the method further comprises the step of: collecting historic data, which represents the process variables, as obtained from the process.

More preferably, the method further comprises the step of: providing a data set from the historic data.

Preferably, each event represents a continuous time period during which one or more process variables satisfy a predetermined criteria.

In a yet further aspect the present invention provides a process development method for use in predicting operation of a process which has a plurality of process variables, the method comprising the steps of: testing process variables from within a data set against predetermined criteria to identify one or more events, where each event is a condition relating to one or more process variables; for each identified event, determining whether the event is a cause event or an effect event and an association with one or more other events as effect events or cause events; and in response to input of the one or more process variables, providing a control indication which identifies one or more events, and, for each identified event, identifies the event as one of a cause event or an effect event and the one or more associated other events as effect events for a cause event or cause events for an effect event.

In one embodiment, for a cause event, the control indication includes an estimation of a time period to manifestation of the one or more effect events.

In one embodiment the control indication is provided automatically to the process such as to control the same.

Preferably, the method further comprises the step of: collecting historic data, which represents the process variables, as obtained from the process.

More preferably, the method further comprises: providing the data set from the historic data.

In one embodiment each event represents a continuous time period during which one or more process variables satisfy a predetermined criteria.

Examples of process plants where the present invention can be employed are as follows.

Oil/gas production fields, where a field consisting of multiple wells produces a combination of crude oil, water and gas, and such fields include critical items of equipment, for example, wells and lines in service, and critical process variables, such as flow rates, temperatures and product qualities.

Refining and petrochemical plants.

Milling plants in which coarse, solid materials are continuously milled to produce fine powders to specified particle size distributions. Such mills include hammer mills, attritor mills, ball mills, air or water jet mills and roll mills.

Chemical and minerals processing plants, such as cement manufacturing plants.

Power generating plants and ancillary equipment.

Food processing plants.

Paper milling plants.

Refrigeration plants.

Heating plants.

Ventilation plants.

A significant advantage of the present invention is in providing a robust and practical solution for large-scale manufacturing and production processes, where: (i) there are a large number of process variables, which may, in isolation or in combination with other variables, cause a change in operation; (ii) there is a time delay between changes in operation and the related variables or combinations of variables causing the change in operation; (iii) the quality or reliability of the sampled production data is noisy and unreliable; (iv) a number of unrelated changes in operation may occur simultaneously; and (v) there are relatively few occurrences of the changes in operation to be analysed.

Other significant advantages over alternative methods for analysis and monitoring of process performance include: (i) the event definitions are transparent to the user and can therefore easily be validated as representative of plant operation; (ii) the associations between variables can be automatically built by making use of historical data without the requirement for complex models or additional plant tests; (iii) when an event or combination of events occurs, potential causes or likely effects can be identified automatically; (iv) any likely elapsed time period between related events is determined automatically; and (v) the relationship between events can be easily updated to reflect changes in plant characteristics by utilizing more recent historical operating data.

Figure 2:
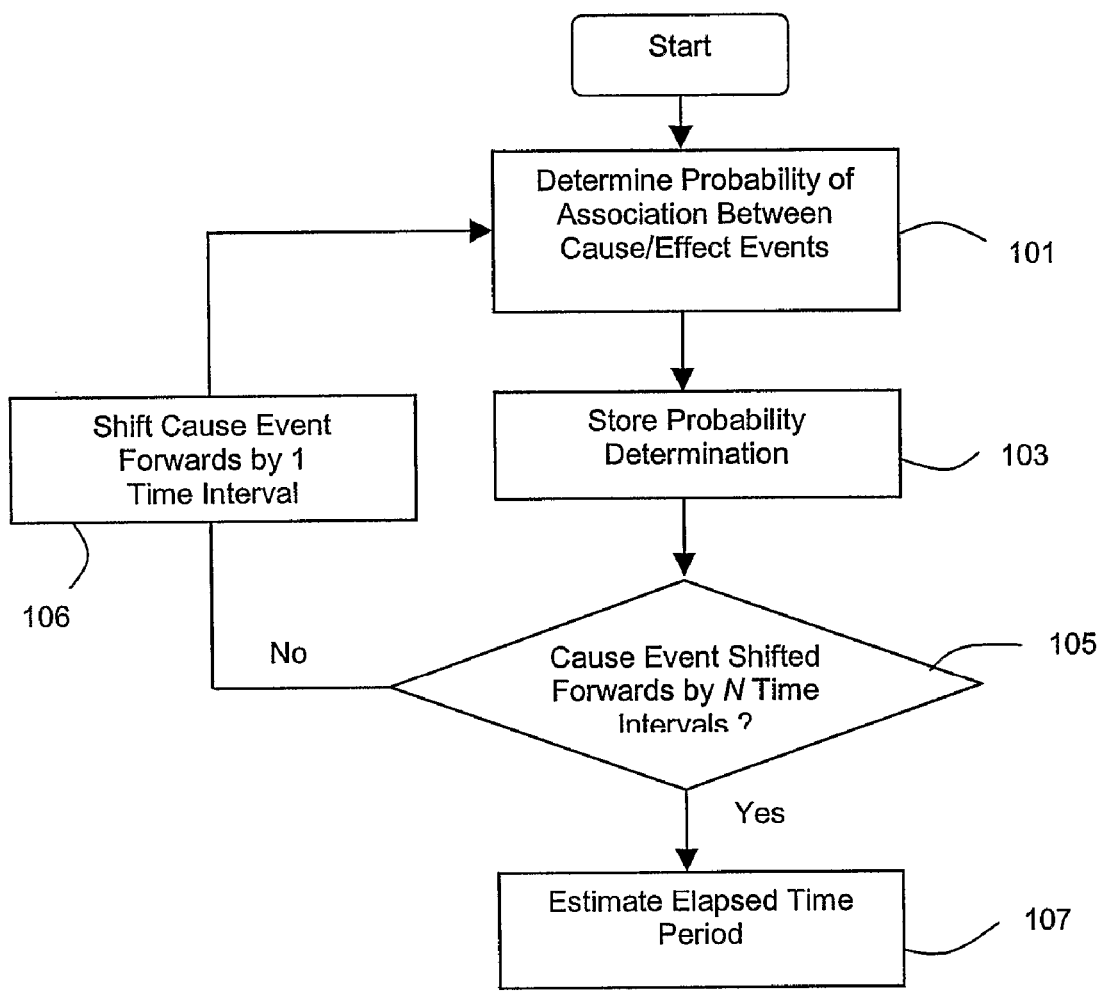
Figure 3:
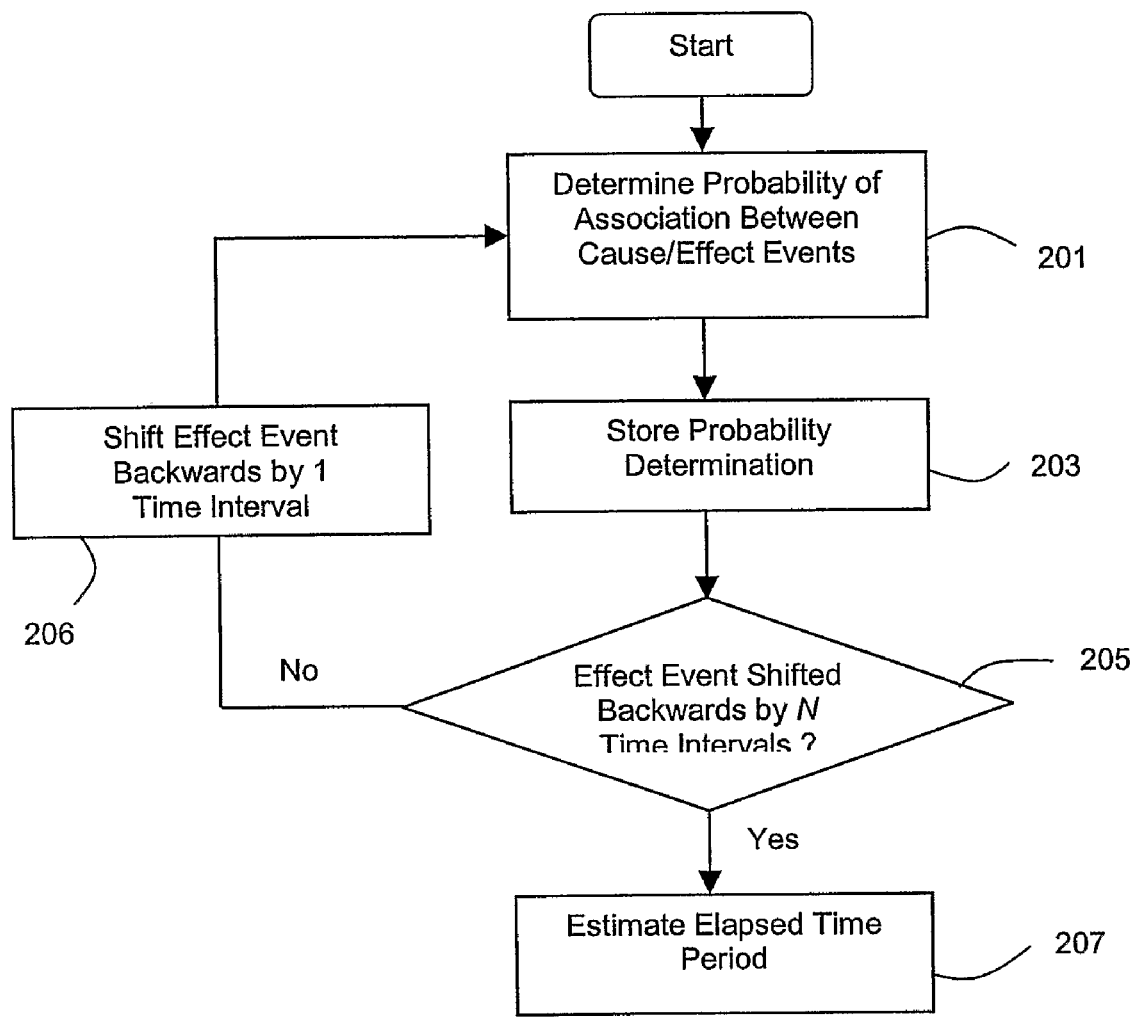

A preferred embodiment of the present invention will now be described hereinbelow by way of example only with reference to the accompanying drawings, in which:

FIG. 1 schematically illustrates a process control system in accordance with a preferred embodiment of the present invention;

FIG. 2 illustrates a flow chart of a time estimation algorithm in respect of an effect of a cause event as determined by the process control system of FIG. 1; and FIG. 3 illustrates a flow chart of a time estimation algorithm in respect of a cause of an effect event as determined by the process control system of FIG. 1.

The process control system 3 is operative to monitor a process system 5 to identify one or more events, through monitoring one or more process variables (PVs) of the process system 5, in this embodiment on-line, and predict associations between each identified event and the causes or effects in respect of the respective event, thereby enabling control of the process system 5 based on the predicted associations.

As will be described in more detail hereinbelow, an event is an occurrence which is significant to the operation of the process system 5, and is defined as a continuous period of time during which one or more PVs have a predetermined criteria. In this embodiment each event is accorded a start and finish time and a logical description.

PVs represent parameters which are critical to the performance of the process system 5, and typically include flow rates, pressures, temperatures, product characteristics, and the status of equipment in the process system 5. The PVs can either be variables which are measured directly from the process system 5 or, as will be described in more detail hereinbelow, determined as functions of the measured variables, for example, as ratios of numeric variables, coefficients, rates of change of numeric variables over a period of time, average values, data variance and standard deviations.

In one embodiment the process system 5 comprises an oil/gas field which comprises a plurality of wells 6, and lines which interconnect the same. In such an oil/gas field, certain ones of the wells and lines are provided to deliver oil/gas and others of the wells include injectors for injecting water thereinto in order to facilitate the delivery of oil/gas from the ones of the wells, and a particular application of the system is to enable control of oil/gas field, both through control of the injectors at existing wells and the provision of new wells, where for the delivery of oil/gas or the injection of water, in order to optimise the delivery of oil/gas.

The system comprises a data collection module 9 for collecting historic data as obtained from the process system 5, which represent PVs, as either numeric or continuous variables. In this embodiment the data collection module 9 is configured to download data from one or more storage locations, typically databases, but in other embodiments the data could be transferred using a storage medium.

The system further comprises a data processing module 15 which is operative to check the historic data set for errors and alter the data set in response thereto, for example, by deleting bad records and making corrections, and, as appropriate, refine the data set, as will be described in more detail hereinbelow, to provide a processed data set.

In this embodiment the data processing module 15 is operative such as one or both to average or aggregate a plurality of records, in order to minimize the effect of noise.

In this embodiment the data processing module 15 is operative to identify further PVs from the processed data set, such as ratios of numeric variables, coefficients, rates of change of numeric variables over a period of time, average values, data variance and standard deviations.

In this embodiment discrete variables, which represent the status of operating equipment, can be calculated from a plurality of inputs, in order to overcome the problems of poor or unreliable instrumentation.

The system further comprises an event identification module 17 for testing the identified PVs against predetermined criteria, in order to identify events. For example, where a PV is above or below a predetermined limit, such as where an operating pressure has a sustained increase over a period of time, or a PV, which represents the status of equipment, has a predetermined status, such as pump on or pump off.

In this embodiment the event identification module 17 is operative to allow the start and finish times of any event to be validated, and the manual rejection of any event, through the application of expert knowledge.

In this embodiment the event identification module 17 is also operative to allow for the manual configuration of a new event, again through the application of expert knowledge.

In this embodiment the event identification module 17 maintains an audit record of all manual interventions, such as to allow for subsequent analysis, and in one embodiment provides for the graphical display of the detection and validation of events, in a preferred embodiment in the form of Gantt chart.

The system further comprises an event association module 19 which utilizes rule association techniques, which have associated rule parameters, to identify patterns in the processed data set, which are expressed as a rule set and associated probabilities.

Rule association is an established technique, which can identify patterns in data sets. The patterns are expressed as a set of rules and probabilities, and in this embodiment the confidence of a rule is determined by the percentage of the data sub-sets in the processed data set which satisfy the rule.

Merely by way of example, one such association rule could be expressed as:

If PV1 (e.g. Injector Flow A) is high

And PV2 (e.g. Injector Flow B) is low

Then confidence CPM1 (e.g. Well 1 Production) will increase is 75%

The event association module 19 is further operative to identify whether an event or a combination of events is a cause event, that is, an input of the process, or an effect event, that is, an output, of the process.

Where an event is identified as a cause, the event association module 19 is operative to determine the probability of an association between the cause and resulting events.

By way of example, where the condition of a PV is identified as a cause event:

| | |
|---|---|
| Cause Event: | PV1 (e.g. Injector Flow A) is high |
| Associated Events: | CPM2 (e.g. Well 2 Production) increases with a confidence of 75% |
| | CPM3 (e.g. Well 3 Production) increases with a confidence of 65% |

Where an event is identified as an effect, the event association module 19 is operative to determine the probability of an association between the effect and causing events.

By way of example, where the condition of a PV is identified as an effect event:

| | |
|---|---|
| Effect Event: | CPM3 (e.g. Well 3 Production) increases |
| Associated Events: | PV1 (e.g. Injector Flow A) has a confidence of 75% |
| | PV2 (e.g. Injector Flow B) has a confidence of 65% |

In this embodiment the event association module 19 is operative further to estimate a time period between an identified event and one or more identified associated events, thereby enabling a prediction of associated events in time.

In relation to the identification of a cause event, such a determination is particularly advantageous as there can be a delayed response between a cause event, that is, an input to a process, and one or more resulting effect events, that is, one or more outputs to the process. This delay can range from several seconds to hours, weeks or even months in the case of an oil/gas field.

In relation to the identification of an effect event, such a determination enables the establishment of a rule association with the one or more associated cause events and the time delay therefrom.

Referring to FIG. 2, where an event is identified as a cause event, the following algorithm is applied to estimate the elapsed time period between the cause event and the predicted associated resulting events.

In a first step (Step 101), the probability of association between the cause event and resulting effect events is determined.

The determined probability of association is then stored (Step 103).

A determination is then made as to whether the start and end times of the cause event have been shifted forwards by a predetermined number N of time intervals, where the number N of time intervals is defined by the operator (Step 105).

Where the start and end times of the cause event have not been shifted forwards by a predetermined number N of time intervals, the start and end times of the cause event are then shifted forwards by one time interval (Step 106) and the first step (Step 101) is repeated. In this embodiment the time interval is a unit of time, such as a second, minute, hour, day, week or month, which is dependent on the reference unit of time in the data set.

The estimated elapsed time period is then determined to be equal to the number of time intervals where the highest confidence of association between events occurs (Step 107).

Referring to FIG. 3, where an event is identified as an effect, the following algorithm is applied to estimate the elapsed time period between the effect event and the one or more predicted cause events.

In a first step (Step 201), the probability of association between the effect event and cause events is determined.

The determined probability of association is then stored (Step 203).

A determination is then made as to whether the start and end times of the effect event have been shifted backwards by a predetermined number N of time intervals, where the number N of time intervals is defined by the operator (Step 205).

Where the start and end times of the effect event have not been shifted backwards by a predetermined number N of time intervals, the start and end times of the effect event are then shifted backwards by one time interval (Step 206), and the first step (Step 201) is repeated. In this embodiment the time interval is a unit of time, such as a second, minute, hour, day, week or month, which is dependent on the reference unit of time in the data set.

The estimated elapsed time period is then determined to be equal to the number of time intervals where the highest confidence of association between events occurs (Step 207).

In this embodiment the event association module 19 is operative to allow an operator to configure one or more rules to prevent the identification of a false association between events. By way of example, one such rule would be if two pieces of equipment were located more than a predetermined distance apart, then any predicted association between events relating to the two pieces of equipment would be false. Also, by way of further example, exclusion rules can apply to specific time periods, such as during plant shutdown or a known period of instrument calibration.

In this embodiment the system further comprises an event control module 21 which logs, in real-time from the process system 5, data which corresponds to the one or more PVs which are associated with the one or more events, and provides an alert to an operator if an event is identified, which alert identifies the event, as either a cause event or an effect event, thereby facilitating improved control of the process system 5.

Where the event is identified as a cause event, the event control module 21 identifies one or more predicted resulting effects and estimates the time delay to the predicted manifestation of the one or more effect events.

Where the event is identified as an effect event, the event control module 21 identifies one or more predicted causes.

In one embodiment the event control module 21 is operative automatically to control the operation of the process system 5 in response to the association of one or more events with an identified event. Where the identified event is a cause event, the process system 5 is controlled such as to avoid any undesired associated effect events, for example, by the manipulation of PVs to prevent or at least alleviate predicted events, the isolation of certain process plant, or possibly the shutdown of the process system 5 where the predicted events could be catastrophic. Where the identified event is an effect event, the process system is controlled such as to overcome any undesired cause events, for example, by the manipulation of the PVs of any cause events, the isolation of certain process plant, for example, to enable modification, upgrading or repair of the isolated plant, or possibly the shutdown of the process system 5 where the cause events cannot be otherwise rectified.

In this embodiment the event control module 21 can also be used as a diagnostic tool to determine potential causes of an effect event or as a predictive tool to identify possible effects of a cause event. In one embodiment a model data set can be employed to simulate cause and effect events.

This embodiment finds particular application in relation to the operation of oil/gas fields as described hereinabove, both through control of the injectors at existing wells and the siting of new wells, where for the delivery of oil/gas or the injection of water, in order to optimize the delivery of oil/gas.

Finally, it will be understood that the present invention has been described in its preferred embodiment and can be modified in many different ways without departing from the scope of the invention as defined by the appended claims.

The invention claimed is:

1. A process control system for use in controlling an operation of an oil/gas field which comprises a plurality of wells and has a plurality of process variables, comprising:
an event identification module for testing process variables from within a data set against predetermined criteria to identify one or more events, wherein each event is a condition relating to one or more process variables for the oil/gas field and at least one event represents a continuous time period during which one or more process variables satisfy a predetermined criteria, with the at least one event having an assigned start and end times;
an event association module which is operative, for each identified event, to determine whether the event is a cause event or an effect event, and to determine an association with one or more other events as effect events or cause events; and
an event control module operative to log, from the oil/gas field, one or more process variables attributed to the one or more events, and to provide a control indication in response to each identified event, wherein the control indication identifies the event as one of a cause event or an effect event and identifies the one or more events associated with the identified event as effect events for the identified event being a cause event or as cause events for the identified event being an effect event;
and wherein the event association module is operative to estimate a time period between the identified event and one or more of the events associated with the identified event.

2. The process control system of claim 1, wherein the event association module is operative to estimate the time period between an identified cause event and one of the effect events associated with the identified cause event by:
determining a probability of association between the identified cause event and the associated effect event;
repeatedly shifting forward the start and end times by a time interval and determining the probability of association between the identified cause event and the associated effect event; and
identifying the estimated time period as the time interval with a highest probability of association.

3. The process control system of claim 1, wherein the event association module is operative to estimate the time period between an identified effect event and one of the cause events associated with the identified effect event by:
determining a probability of association between the identified effect event and the associated cause event;
repeatedly shifting backward the start and end times by a time interval and determining the probability of association between the identified effect event and the associated cause event; and
identifying the estimated time period as the time interval with the highest probability of association.

4. The process control system of claim 1, wherein the event control module is operative automatically to control operation of the oil/gas field.

5. The process control system of claim 1, wherein each event is graphically represented on a time basis.

6. The process control system of claim 1, further comprising:

a data collection module for collecting historic data representing the process variables, as obtained from the oil/gas field.

7. The process control system of claim 6, further comprising:
   a data processing module for providing a data set from the historic data.

8. The process control system of claim 1, wherein each event represents a continuous time period during which one or more process variables satisfy a predetermined criterion.

9. A process development system for use in predicting operation of an oil/gas field which comprises a plurality of wells and has a plurality of process variables, comprising:
   an event identification module operative to test process variables from within a data set against predetermined criteria to identify one or more events, wherein each event is a condition relating to one or more process variables and at least one event represents a continuous time period during which one or more process variables satisfy a predetermined criteria, with the at least one event having assigned start and end times;
   an event association module operative, for each identified event, to determine whether the event is a cause event or an effect event and an association with one or more other events; and
   an event control module operative, in response to input of one or more process variables, to provide a control indication that identifies one or more events, and, for each identified event, identifies the event as one of a cause event or an effect event and identifies the one or more events associated with the identified event as effect events for the identified event being a cause event or as cause events for the identified event being an effect event;
   and wherein the event association module is operative to estimate a time period between the identified event and one or more of the events associated with the identified event.

10. The process control system of claim 9, further comprising:
    a data collection module for collecting historic data representing the process variables, as obtained from the oil/gas field.

11. The process control system of claim 10, further comprising:
    a data processing module for providing the data set from the historic data.

12. The process control system of claim 9, wherein each event represents a continuous time period during which one or more process variables satisfy a predetermined criterion.

13. A process control method for use in controlling operation of an oil/gas field which comprises a plurality of wells and has a plurality of process variables, the method comprising the steps of:
    logging from the oil/gas field one or more process variables;
    testing the logged process variables to identify one or more events, wherein each event is a condition relating to one or more process variables for the oil/gas field and at least one event represents a continuous time period during which one or more process variables satisfy a predetermined criterion, with the at least one event having assigned start and end times;
    for each identified event, determining whether the event is a cause event or an effect event and determining an association with one or more other events;
    providing a control indication in response to each identified event, where the control indication identifies the event as one of a cause event or an effect event and identifies the one or more events associated with the identified event as effect events for the identified event being a cause event or as cause events for the identified event being an effect event; and
    estimating a time period between the identified event and one or more of the events associated with the identified event.

14. The process control method of claim 13, wherein, for the identified event being a cause event, the estimating step comprises:
    determining a probability of association between the identified cause event and the associated effect event;
    repeatedly shifting forward the start and end times by a time interval and determining the probability of association between the identified cause event and the associated effect event; and
    identifying the estimated time period as the time interval with a highest probability of association.

15. The process control method of claim 13, wherein, for the identified event being an effect event, the estimating step comprises:
    determining a probability of association between the identified effect event and the associated cause event;
    repeatedly shifting backward the start and end times by a time interval and determining the probability of association between the identified effect event and the associated cause event; and
    identifying the estimated time period as the time interval with a highest probability of association.

16. The process control method of claim 13, wherein the control indication is provided automatically to the oil/gas field to control the oil/gas field.

17. The process control method of claim 13, wherein each event is graphically represented on a time basis.

18. The process control method of claim 13, further comprising the step of:
    collecting historic data representing the logged process variables, as obtained from the oil/gas field.

19. The process control method of claim 18, further comprising the step of:
    providing a data set from the historic data;
    and wherein the testing step comprises:
    testing process variables from within the data set against predetermined criteria to identify one or more events, wherein each event is a condition relating to one or more process variables and at least one event represents a continuous time period during which one or more process variables satisfy a predetermined criterion, with the at least one event having assigned start and end times.

20. The process control method of claim 13, wherein each event represents a continuous time period during which one or more process variables satisfy a predetermined criterion.

21. A process development method for use in predicting operation of an oil/gas field which comprises a plurality of wells and has a plurality of process variables, the method comprising the steps of:
    testing process variables from within a data set against predetermined criteria to identify one or more events, wherein each event is a condition relating to one or more process variables and at least one event represents a continuous time period during which one or more process variables satisfy a predetermined criteria, with the at least one event having assigned start and end times;

for each identified event, determining whether the event is a cause event or an effect event, and determining an association with one or more other events;

in response to input of one or more process variables, providing a control indication which identifies one or more events, and, for each identified event, identifies the event as one of a cause event or an effect event and identifies the one or more events associated with the identified event as effect events for the identified event being a cause event or as cause events for the identified event being an effect event; and estimating a time period between the identified event and one or more of the events associated with the identified event.

22. The process development method of claim 21, wherein, for the identified event being a cause event, the estimating step comprises:

determining a probability of association between the identified cause event and the associated effect event;

repeatedly shifting forward the start and end times by a time interval and determining the probability of association between an identified cause event and an associated effect event; and identifying the estimated time period as the time interval with a highest probability of association.

23. The process development method of claim 21, wherein, for the identified event being an effect event, the estimating step comprises:

determining a probability of association between the identified effect event and the associated cause event;

repeatedly shifting backward the start and end times by a time interval and determining the probability of association between an identified effect event and an associated cause event; and identifying the estimated time period as the time interval with a highest probability of association.

24. The process development method of claim 21, wherein the control indication is provided automatically to the oil/gas field to control the oil/gas field.

25. The process development method of claim 21, further comprising the step of: collecting historic data representing the process variables, as obtained from the oil/gas field.

26. The process development method of claim 25, further comprising the step of:

providing the data set from the historic data.

27. The process development method of claim 21, wherein each event represents a continuous time period during which one or more process variables satisfy a predetermined criterion.

* * * * *